March 31, 1936.  J. P. KREJMAS  2,035,554
DRIVE SHAFT
Filed April 27, 1935   5 Sheets-Sheet 4
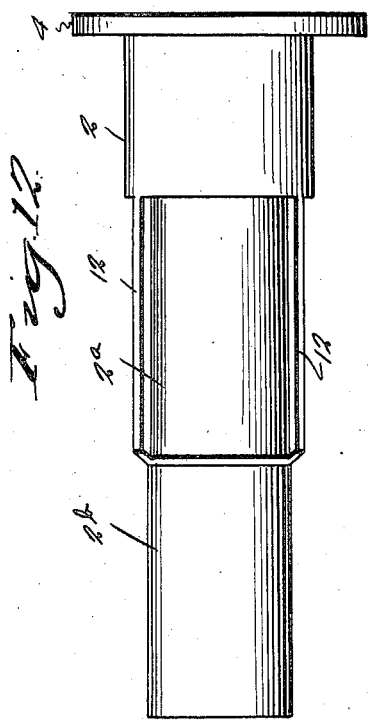
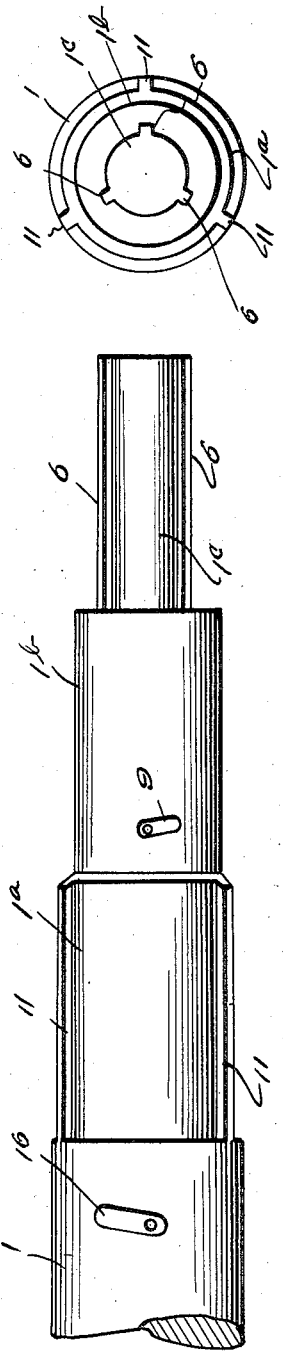
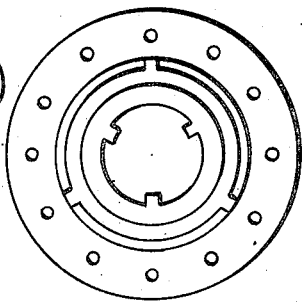
Inventor
Joseph P. Krejmas
By Clarence A. O'Brien
Attorney March 31, 1936.  J. P. KREJMAS  2,035,554
DRIVE SHAFT
Filed April 27, 1935  5 Sheets-Sheet 5
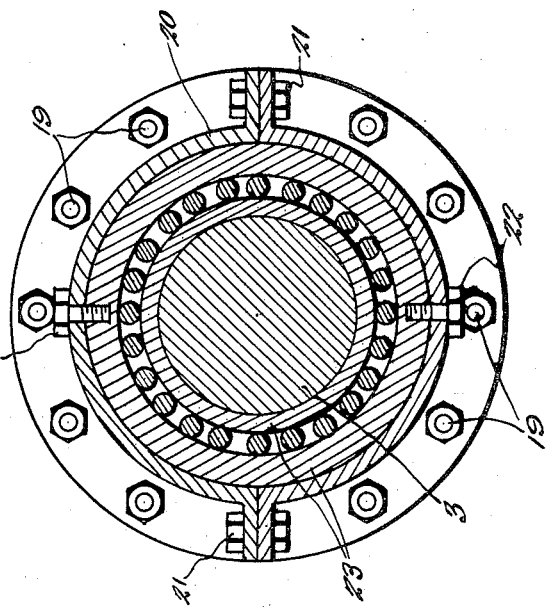
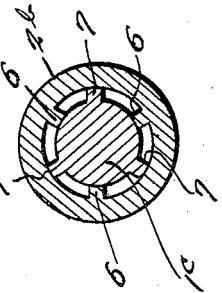
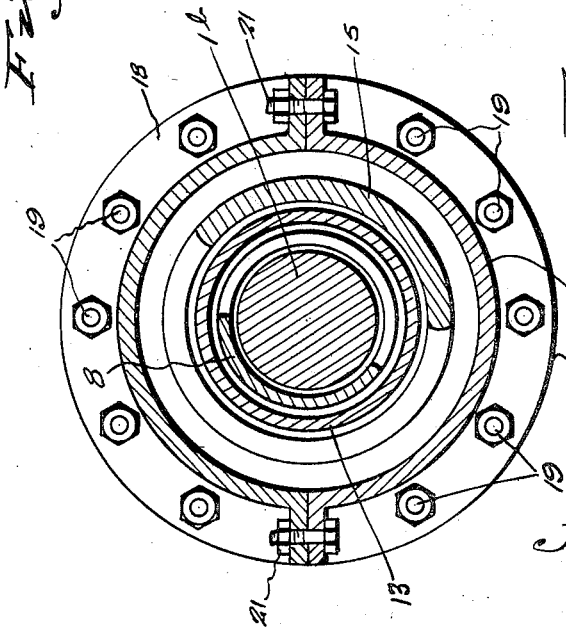
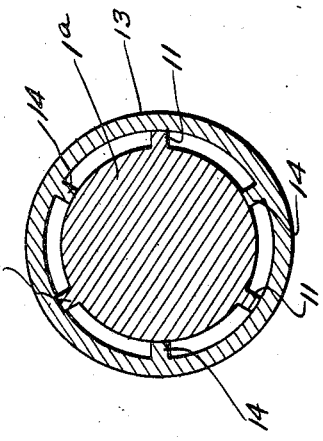
Inventor
Joseph P. Krejmas
By *Clarence A. O'Brien*
Attorney Patented Mar. 31, 1936

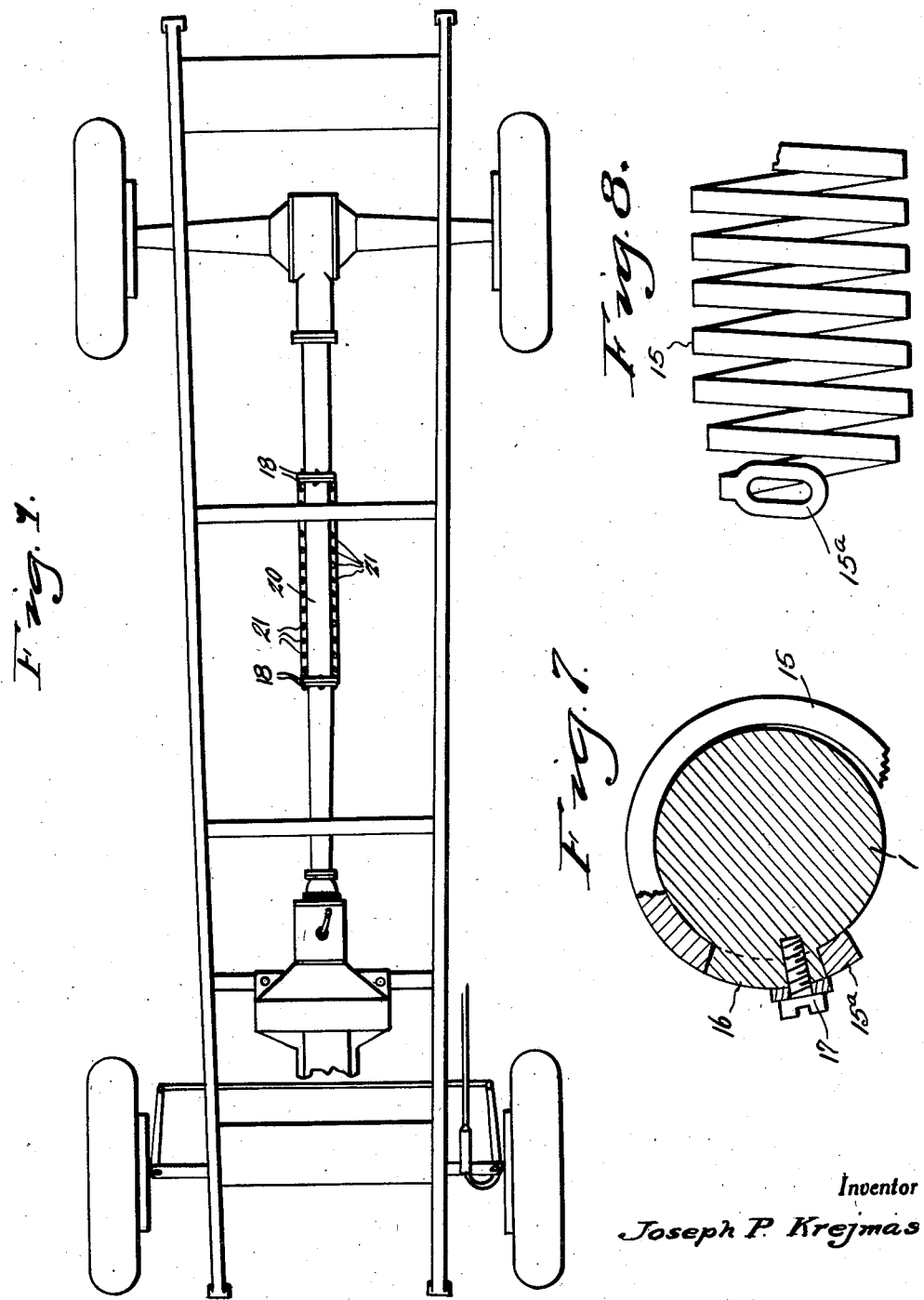

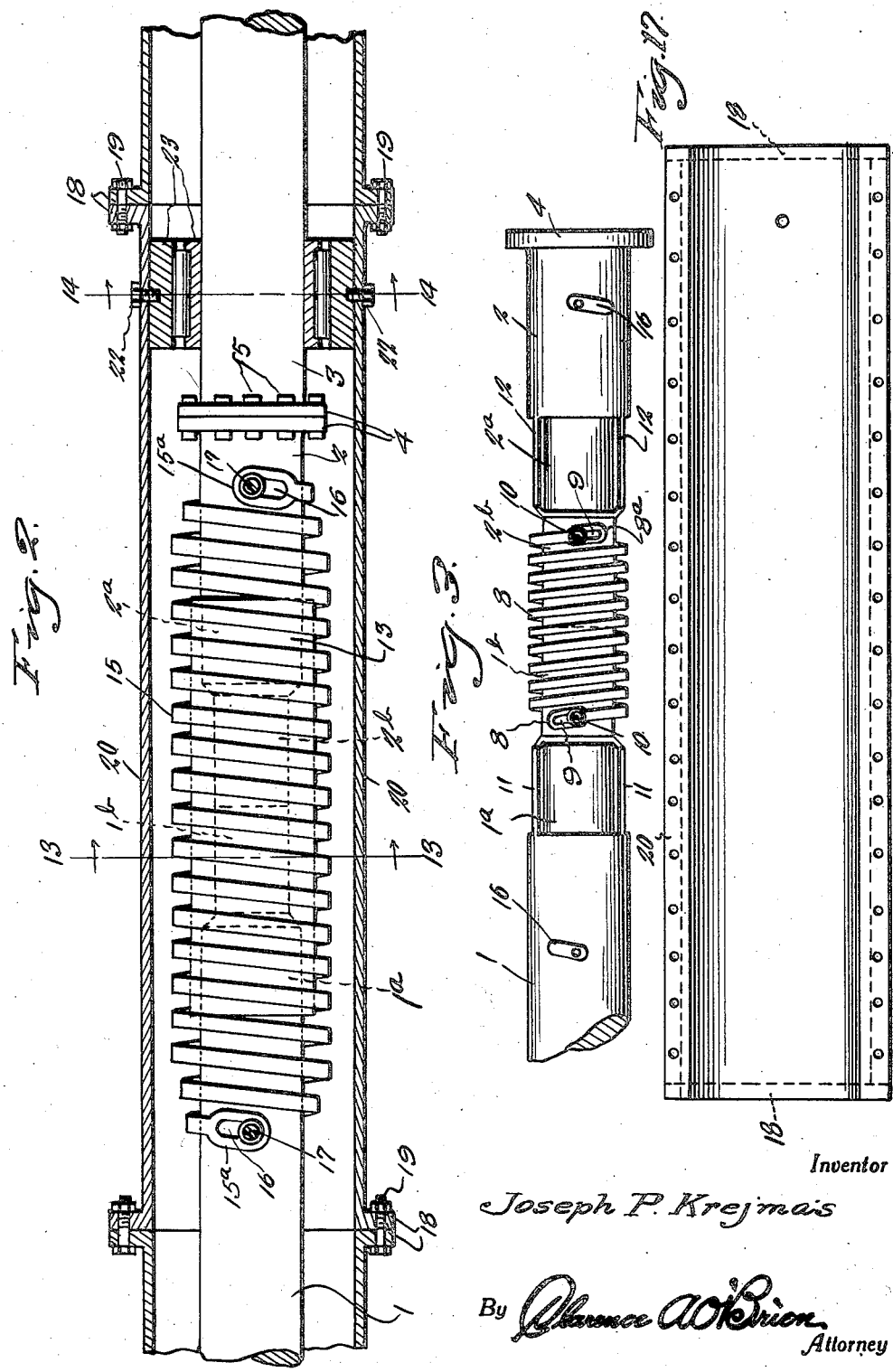

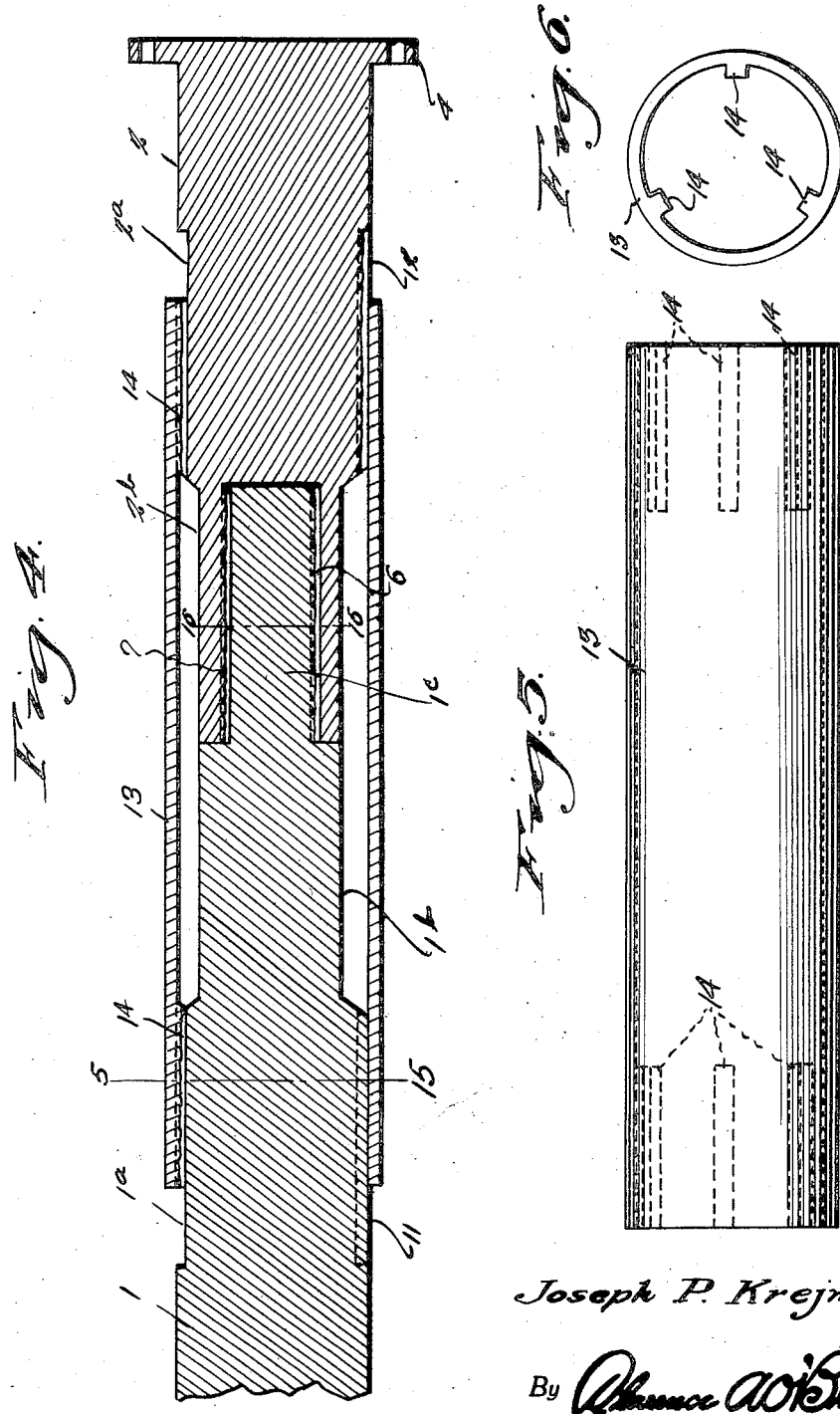

2,035,554

UNITED STATES PATENT OFFICE 2,035,554

DRIVE SHAFT

Joseph Philip Krejmas, Turners Falls, Mass.

Application April 27, 1935, Serial No. 18,589

6 Claims. (Cl. 64—27)

This invention relates to shafting and more particularly to a drive shaft.

An object of the invention is to provide a drive shaft particularly adapted for use in connection with motor driven vehicles, and characterized by such a construction, combination and arrangement of parts as will tend to absorb all shock as may occur under circumstances and as a result, for example, of a badly worn clutch plate or from letting the clutch out too fast, the shock resulting therefrom often tending to damage such parts of the vehicle, as for example, the gears, axle, etc.

The invention together with its objects and advantages will be best understood from a study of the following description taken in connection with the accompanying drawings wherein:

Figure 1 is a plan view illustrating the application of the invention to an automobile.

Figure 2 is a view mostly in elevation through the device.

Figure 3 is a fragmentary elevational view of two aligned shaft sections and a spring associated therewith.

Figure 4 is an enlarged longitudinal sectional view through two aligned shaft sections and a sleeve associated therewith.

Figure 5 is an elevational view of the sleeve.

Figure 6 is an end elevational view of the sleeve.

Figure 7 is a fragmentary detail sectional view showing the manner of securing one end of a spring to a shaft section.

Figure 8 is an elevational view of a portion of a spring.

Figure 9 is an elevational view of one end of one of the shaft sections.

Figure 10 is an end elevational view of said shaft sections.

Figure 11 is an end elevational view of a second shaft section.

Figure 12 is a side elevational view of the second shaft section.

Figures 13 and 14 are detail views taken substantially on the lines 13—13, and 14—14 respectively of Figure 2.

Figure 15 is a detail sectional view taken substantially on the line 15—15 of Figure 4.

Figure 16 is a detail sectional view taken substantially on the line 16—16 of Figure 4.

Figure 17 is a plan view of a section of the shaft housing.

Referring to the drawings by reference numerals it will be seen that the improved drive, or as otherwise referred to in an automobile structure, propeller shaft, in accordance with the present invention consists of three aligned shaft sections 1, 2 and 3 respectively. The shaft sections 2 and 3 at their meeting ends are provided with flanges 4 whereby through the medium of bolts 5 said shaft sections 2 and 3 are positively secured together.

The shaft sections 1 and 2 are connected together in a manner clear from the following. As best shown in Figure 4 the shaft section 1 at the end thereof connected with the shaft section 2 is provided with three diameters 1a, 1b and 1c respectively. Also, the shaft section 2 is provided with a diameter 2a and a diameter 2b, the latter diameter being hollowed out to receive or provide a bearing for the diameter 1c of the shaft 1. In this connection it will also be noted that the diameter 1c of shaft 1 is provided as best shown in Figure 9 with a series of circumferentially longitudinal ribs 6 while the diameter 2b of shaft 2 is provided internally with a series of circumferentially spaced longitudinal ribs 7 that, when the diameters 1c and 2b are received one within the other the ribs 6 and 7 are disposed in alternation and thereby serve to limit relative rotation of shafts 1 and 2 so that either shaft can rotate only so far before transmitting its rotative movement to the other shaft (see Figure 16).

What may be termed a reverse spring 8 also serves to connect the shafts 1 and 2 and this spring 8 in the form of a coil spring is disposed about the diameters 1b and 2b of the shafts 1 and 2 as best shown in Figure 3, and at the ends thereof the spring 8 terminates in eyes or loops 8a that are engaged with lugs 9 on the diameters 1b and 2b of shafts 1 and 2 as best shown in Figure 3. Said ends 8a are securely engaged with the lugs 9 through suitable bolt means 10. Obviously by reason of the spring 8 and its connection with the shafts 1 and 2 a turning of one shaft will have a tendency to turn the complemental shaft in a corresponding direction and without great shock as might result from the sudden turning or driving movement of one of the shaft sections.

The shaft 1 on its diameter 1a is provided with a series of circumferentially spaced longitudinal ribs 11 while the diameter 2a of shaft 2 is similarly provided with ribs 12.

Housing the spring 8 is a sleeve 13 of a diameter to accommodate the diameters 1a and 2a of shafts 1 and 2, and adjacent its ends the sleeve 13 is provided internally with a series of circumferentially spaced ribs 14, each series of ribs being arranged in alternate relation to the ribs 11 and 12 respectively as will be clear from a study of Figure 15. Disposed about the sleeve 13 is what may be termed a drive spring 15 which, except for size, is identical with spring 8, being provided at its end with eyes or loops 15a that engage lugs 16 formed on the largest diameters of shafts 1 and 2 and are secured in engagement with the lugs 16 by suitable screw and washer means 17. Thus it will be seen that the spring 15 serves as an additional resilient connection between the shafts 1 and 2, the spring 15 being in the form of a forward drive connection between the shafts 1 and 3 so as to connect the shafts in forward drive, and the spring 8 acting as a reverse drive connection between the shafts so as to place the shaft in reverse drive.

It will thus be seen that with a shaft of this character terrific shock will not be imparted to, for example, the rear axle of the automobile in the event, for example, the clutch pedal is let out too quickly since, with this connection shaft 1, for example will first turn tightening up, for example, the spring 15 resulting in a transmission of drive from shaft 1 to shaft 2 and continuing through shaft section 3 to the rear axle of the vehicle through the differential in the usual manner.

A housing for the propeller shaft consisting of the sections 1, 2 and 3 is provided and consists of a plurality of cylindrical sections which at their meeting ends are provided with apertured flanges 18 so that through the medium of bolts 19 said sections may be readily joined together. These sections include a center section inclosing the joint between the shaft section 1 and 2 and this center section is divided longitudinally into a pair of complemental semi-cylindrical sections 20 which at their meeting longitudinal edges are provided with apertured flanges whereby through the medium of bolts 21 said sections 20 are secured together. (See Figures 13, 14 and 17.)

Secured by screws or other suitable means 22 within the end of the shaft housing 20 that receives the end of shaft section 3 joined with shaft section 2 is a suitable bearing 23 which bearing will serve as a support for the shaft 3 to prevent "chattering" of the shaft.

Having thus described the invention, what is claimed as new is:

1. A propeller shaft comprising aligned shaft sections one of which has an end of three diameters and the other of which has an end of two diameters, the second named shaft having its smaller diameter provided with a socket and circumferentially spaced longitudinal ribs internally of the socket and the first shaft having its smaller diameter adapted to fit in the socket and provided with circumferentially spaced ribs arranged in the socket in alternate relation to the first ribs, a spiral spring disposed about said end of the shaft section and secured at its respective opposite end to the shaft sections, a sleeve housing said spring, and said shaft sections at said ends each having a diameter provided with circumferentially spaced longitudinal ribs, and said sleeve adjacent each end being provided with circumferentially spaced ribs respectively arranged in alternation with the last named ribs on said shaft ends, and a second spiral spring disposed about said sleeve and anchored at its end to the exposed ends of said shaft sections, the convolutes of the first named spring spiraling in one direction, and the convolutes of the last named spring spiraling in a reverse direction.

2. A propeller shaft comprising aligned shaft sections one of which has an end of three diameters and the other of which has an end of two diameters, the second named shaft having its smaller diameter provided with a socket and circumferentially spaced longitudinal ribs internally of the socket and the first shaft having its smaller diameter adapted to fit in the socket and provided with circumferentially spaced ribs arranged in the socket in alternate relation to the first ribs, a spiral spring disposed about said end of the shaft section and secured at its respective opposite end to the shaft sections, a sleeve housing said spring, and said shaft sections at said ends each having a diameter provided with circumferentially spaced longitudinal ribs, and said sleeve adjacent each end being provided with circumferentially spaced ribs respectively arranged in alternation with the last named ribs on said shaft ends, and a second spiral spring disposed about said sleeve and anchored at its end to the exposed end of said shaft section, the convolutes of the first named spring spiraling in one direction, and the convolutes of the last named spring spiraling in a reverse direction, and a housing for said shafts including a pair of complemental shaft sections enclosing the last named spring and bolted together.

3. A propeller shaft comprising aligned shaft sections one of which has an end of three diameters and the other of which has an end of two diameters, the second named shaft having its smaller diameter provided with a socket and circumferentially spaced longitudinal ribs internally of the socket and the first shaft having its smaller diameter adapted to fit in the socket and provided with circumferentially spaced ribs arranged in the socket in alternate relation to the first ribs, a spiral spring disposed about said ends of the shaft sections and secured at its respective opposite ends to the shaft sections, a sleeve housing said spring, and said shaft sections at said ends each having a diameter provided with circumferentially spaced longitudinal ribs, and said sleeve adjacent each end being provided with circumferentially spaced ribs respectively arranged in alternation with the last named ribs on said shaft end, and a second spiral spring disposed about said sleeve and anchored at its end to the exposed end of said shaft section, the convolutes of the first named spring spiraling in one direction, and the convolutes of the last named spring spiraling in a reverse direction, and means for anchoring each of said springs at one end to the end of one of said shaft sections including eyes on the ends of the springs, fixed lugs on the ends of the shaft sections with which said eyes engage and bolt means securing said eyes engaged with the lugs.

4. In a propeller shaft, at least two aligned sections, and resilient means connecting said sections together in a manner to delay transmission of movement from one shaft section to the other and to absorb shock incidental to the driving of one of the shaft sections, said means including a pair of inner and outer spiral springs including an inner reversing spring the convolutes of which are spiralled in one direction, and an outer forward drive spring the convolutes of which are spiralled in a reverse direction.

5. A propeller shaft comprising alined shaft sections one of which is provided in one end with a socket having internal circumferentially spaced longitudinal ribs and the other of which shaft sections has an end fitted in said socket and provided with circumferentially spaced ribs arranged in alternate relation to the first ribs, and resilient means connecting said shaft sections against axial separation and in a manner to delay transmission of movement from one shaft section to the other and to absorb shock incidental to the driving of one of said shaft sections; said resilient means including two spiral springs respectively connected at their respective opposite ends to the ends of the shaft sections, and the helixes of the spring being oppositely pitched.

6. In a propeller shaft, alined shaft sections one of which is provided in one end with an axial socket provided with internal ribs, and the other of which has an end fitted within said socket and also provided with ribs arranged in alternation to the first-named ribs, a pair of substantially circumferentially arranged spiral springs respectively connected at their respective opposite ends with the said ends of the shaft sections, one of said springs having left hand helixes and the other of said springs having right hand helixes, a sleeve arranged between said springs, said sleeve provided internally and adjacent its respective opposite ends with longitudinal ribs, and external ribs on said ends of the shaft sections cooperating with and arranged in alternation with the ribs of the sleeve.

JOSEPH PHILIP KREJMAS.